(12) United States Patent
Tanaka

(10) Patent No.: US 8,358,720 B2
(45) Date of Patent: Jan. 22, 2013

(54) COMMUNICATION DEVICE AND TRANSMISSION CALIBRATION WEIGHT CALCULATION METHOD

(75) Inventor: Takanori Tanaka, Yokohama (JP)

(73) Assignee: Kyocera Corporation, Kyoto (JP)

( * ) Notice: Subject to any disclaimer, the term of this patent is extended or adjusted under 35 U.S.C. 154(b) by 776 days.

(21) Appl. No.: 12/298,291

(22) PCT Filed: Apr. 25, 2007

(86) PCT No.: PCT/JP2007/058951
§ 371 (c)(1),
(2), (4) Date: Aug. 5, 2009

(87) PCT Pub. No.: WO2007/125957
PCT Pub. Date: Nov. 8, 2007

(65) Prior Publication Data
US 2009/0296849 A1    Dec. 3, 2009

(30) Foreign Application Priority Data
Apr. 25, 2006    (JP) .................................. 2006-121347

(51) Int. Cl.
*H04L 27/00* (2006.01)
(52) U.S. Cl. ........ 375/299; 375/295; 327/291; 332/106; 341/20; 341/173
(58) Field of Classification Search .................... 375/299
See application file for complete search history.

(56) References Cited

U.S. PATENT DOCUMENTS

| | | | |
|---|---|---|---|
| 6,157,343 A * | 12/2000 | Andersson et al. ........... | 342/371 |
| 6,559,799 B2 * | 5/2003 | Aoyama et al. ............... | 342/377 |
| 7,145,508 B2 | 12/2006 | Kawasaki | |
| 2003/0186725 A1 * | 10/2003 | Miya et al. .................... | 455/561 |
| 2004/0063469 A1 * | 4/2004 | Kuwahara et al. ......... | 455/562.1 |

(Continued)

FOREIGN PATENT DOCUMENTS

| | | |
|---|---|---|
| EP | 1615361 A1 | 1/2006 |
| JP | 2001-053662 | 2/2001 |

(Continued)

OTHER PUBLICATIONS

Extended European search report dated May 20, 2011 for corresponding European application 07742386.1.

(Continued)

*Primary Examiner* — Shuwang Liu
*Assistant Examiner* — Gina McKie
(74) *Attorney, Agent, or Firm* — DLA Piper (US) LLP

(57) ABSTRACT

A communication device according to the present invention includes a controller 10 configured to send a PN code (A) to a transmission and reception unit 20-1 and send a PN code (B) to a transmission and reception unit 20-$n$ ($n \neq 1$), a transmission system characteristic data acquiring unit 40 configured to acquire reference transmission system characteristic data indicating the characteristic of the PN code (A) sent to the transmission and reception unit 20-1 and acquire transmission system characteristic data indicating the characteristic of the PN code (B) sent to the transmission and reception unit 20-$n$ ($n \neq 1$), a transmission characteristic difference data calculator 41 configured to acquire a transmission characteristic difference data indicating a difference in transmission characteristic between the transmission and reception unit 20-1 and the transmission and reception unit 20-$n$ ($n \neq 1$) on the basis of the reference transmission system characteristic data and the transmission system characteristic data, and a transmission calibration weight calculator 44 configured to calculate transmission calibration weight on the basis of the transmission characteristic difference data.

4 Claims, 8 Drawing Sheets

U.S. PATENT DOCUMENTS

| | | | |
|---|---|---|---|
| 2004/0070533 A1* | 4/2004 | Azuma | 342/174 |
| 2006/0007040 A1* | 1/2006 | Kawasaki | 342/368 |
| 2006/0279459 A1* | 12/2006 | Akiyama et al. | 342/372 |
| 2007/0054699 A1* | 3/2007 | Ding et al. | 455/561 |
| 2010/0105341 A1* | 4/2010 | Chen et al. | 455/102 |

FOREIGN PATENT DOCUMENTS

| | | |
|---|---|---|
| JP | 2002-530998 | 9/2002 |
| JP | 2003-152676 | 5/2003 |
| JP | 2003-264526 | 9/2003 |
| JP | 2005-348236 | 12/2005 |
| JP | 2006-025047 | 1/2006 |

OTHER PUBLICATIONS

Chinese language office action dated Jan. 31, 2012 and its English language translation issued in corresponding Chinese application 200780014932.

* cited by examiner

COMMUNICATION DEVICE AND TRANSMISSION CALIBRATION WEIGHT CALCULATION METHOD

TECHNICAL FIELD

The present invention relates to a communication device having an adaptive array antenna, and a transmission calibration weight calculation method for calculating transmission calibration weight in the communication device.

BACKGROUND ART

In communication devices employing an adaptive array antenna, a transmission system is provided for each of the antennas, and a difference in transmission characteristic between these transmission systems affect on the entire transmission characteristic. Accordingly, in order to reduce the effect, used is transmission calibration weight indicating the difference in transmission characteristic between the transmission systems. In the technique disclosed in Japanese Patent Application Publication 2005-348236, transmission calibration weight is calculated in the following manner. A communication device sequentially sends calibration signals to respective transmission systems. A calibration terminal receives the calibration signals thus sent, and calculates transmission system characteristic data indicating the characteristic of each calibration signal. This transmission system characteristic data show the transmission characteristic of each transmission system. The communication device calculates transmission calibration weight on the basis of the difference between the transmission systems in the transmission system characteristic data.

DISCLOSURE OF THE INVENTION

However, in the above-described conventional technique, calibration signals are separately sent to individual transmission systems. Accordingly, transmission system characteristic data cannot be always calculated under the same condition. For this reason, the difference between the transmission systems in the transmission system characteristic data does not properly show the difference in transmission characteristic between the transmission systems. Accordingly, there is a possibility that a relative difference in transmission characteristic between the transmission systems is not properly reflected on the transmission calibration weight.

Accordingly, an object of the present invention is to provide a communication device and a transmission calibration weight calculation method, which achieve the risk reduction that the relative difference in transmission characteristic between the transmission systems is not properly reflected on the transmission calibration weight.

In order to achieve the above-described object, the communication device according to the present invention is a communication device having an adaptive array antenna, comprising: a transmission system sender configured to send a calibration signal to a reference transmission system which is one of transmission systems respectively corresponding to a plurality of antennas constituting the adaptive array antenna, while sending a calibration signal to other transmission systems; a reference transmission system characteristic data acquiring unit configured to acquire reference transmission system characteristic data indicating the characteristic of the reference transmission system in relation to the calibration signal sent by the transmission system sender to the reference transmission system; a transmission system characteristic data acquiring unit configured to acquire transmission system characteristic data indicating characteristics of the other transmission systems in relation to the calibration signal sent by the transmission system sender to the other transmission systems; a transmission characteristic difference data acquiring unit configured to acquire transmission characteristic difference data indicating a difference in transmission characteristic between the reference transmission system and the other transmission systems on the basis of the reference transmission system characteristic data acquired by the reference transmission system characteristic data acquiring unit and the transmission system characteristic data acquired by the transmission system characteristic data acquiring unit; and a transmission calibration weight calculator configured to calculate transmission calibration weight on the basis of the transmission characteristic difference data acquired by the transmission characteristic difference data acquiring unit in relation to each of the transmission systems other than the reference transmission system among the transmission systems.

According to this, calibration signals can be simultaneously sent to the reference transmission system and the other transmission systems. Accordingly, the possibility that transmission system characteristic data can be calculated under the same condition is increased between these transmission systems. Thus, the possibility that the transmission characteristic difference data acquired by the transmission characteristic difference data acquiring unit properly indicates the difference in transmission characteristic between these transmission systems is increased. As a result, the risk that the relative difference in transmission characteristic between the transmission systems is not properly reflected on the transmission calibration weight is successfully lowered.

In addition, in the above-described communication system, the transmission system sender may send a first calibration signal to the reference transmission system and sends, to the other transmission systems, a second calibration signal having a signal content different from the signal content of the first calibration signal.

According to this, the different calibration signals are simultaneously sent to the reference transmission system and the other transmission systems. Accordingly, even when these signals are received by one calibration terminal, the signals can be separately received.

Furthermore, the above-described communication system may include: a superimposing transmission system sender configured to superimpose the first calibration signal and the second calibration signal and send a signal resulting from the superimposition to the reference transmission system; a reference characteristic difference data acquiring unit configured to acquire reference characteristic difference data indicating the characteristic difference between the first calibration signal and the second calibration signal, which are sent by the superimposing transmission system sender to the reference transmission system; and a corrector configured to correct transmission characteristic difference data acquired by the transmission characteristic difference data acquiring unit on the basis of the reference characteristic difference data acquired by the reference characteristic difference data acquiring unit, wherein the transmission calibration weight calculator calculates transmission calibration weight on the basis of the transmission characteristic difference data after correction by the corrector.

According to this, even if the characteristic difference due to the difference between signal contents of calibration signals exists, correction can be made on the basis of the reference characteristic difference data based on the characteristic difference.

Furthermore, in the above-described communication device, the communication device may perform orthogonal frequency division multiplexing communication; the superimposing transmission system sender performs the sending by one or a plurality of predetermined subcarriers in a predetermined sub-channel; and the transmission system sender performs the sending by a subcarrier other than the one or a plurality of predetermined subcarriers in the predetermined sub-channel in synchronization with the sending by the superimposing transmission system sender.

In one sub-channel, it can be considered that transmission is performed under the same condition even when subcarriers are different. Accordingly, in the above-described communication device, calibration signals can be simultaneously sent from the superimposing transmission system sending unit and the transmission system sending unit by utilizing the different subcarriers in a predetermined sub-channel. Thus, increased is the possibility that the transmission characteristic difference data and the reference characteristic difference data are successfully calculated under the same condition. As a result, achieved is to further decrease the risk that a relative difference in transmission characteristic between the transmission systems is not properly reflected on the calibration weight.

In addition, in each of the above-described communication devices, the transmission system sender sequentially sends a calibration signal, together with a calibration signal send to the reference transmission system, to the respective transmission systems other than the reference transmission system among the transmission systems respectively corresponding to the plurality of antennas constituting the adaptive array antenna, the communication device further comprising: a reception system sender configured to send a calibration signal to all or some of reception systems respectively corresponding to the plurality of antennas constituting the adaptive array antenna in synchronization with the transmission by the transmission system sender; a reception system characteristic data acquiring unit configured to acquire reception system characteristic data indicating the characteristic of the reception system in relation to the calibration signal send by the reception system sender to the reception system; and a reception calibration weight calculator configured to calculate reception calibration weight on the basis of the reception system characteristic data acquired by the reception system characteristic data acquiring unit.

According to this, when the sending unit is sequentially sending calibration signals to each transmission system other than the reference transmission system, reception system characteristic data can be acquired. In other words, reception system characteristic data can be acquired by subtracting one time from the number of the transmission systems. Accordingly, accuracy of reception calibration weight can be increased.

In addition, a transmission calibration weight calculation method according to the present invention is a transmission calibration weight calculation method for calculating transmission calibration weight in a communication device having an adaptive array antenna, the method comprising: a transmission system sending step of sending a calibration signal to a reference transmission system which is one of transmission systems respectively corresponding to a plurality of antennas constituting the adaptive array antenna, while sending a calibration signal to other transmission systems; a reference transmission system characteristic data acquiring step of acquiring reference transmission system characteristic data indicating the characteristic of the reference transmission system in relation to the calibration signal sent to the reference transmission system at the transmission system sending step; a transmission system characteristic data acquiring step of acquiring transmission system characteristic data indicating characteristics of the other transmission systems in relation to the calibration signal sent to the other transmission systems at the transmission system sending step; a transmission characteristic difference data acquiring step of acquiring transmission characteristic difference data indicating a difference in transmission characteristic between the reference transmission system and the other transmission systems on the basis of the reference transmission system characteristic data acquired at the reference transmission system characteristic data acquiring step and the transmission system characteristic data acquired at the transmission system characteristic data acquiring step; and a transmission calibration weight calculation step of calculating transmission calibration weight on the basis of the transmission characteristic difference data acquired at the transmission characteristic difference data acquiring step in relation to the transmission systems other than the reference transmission system, among the plurality of antennas.

BEST MODE FOR CARRYING OUT THE INVENTION

Figure 1:
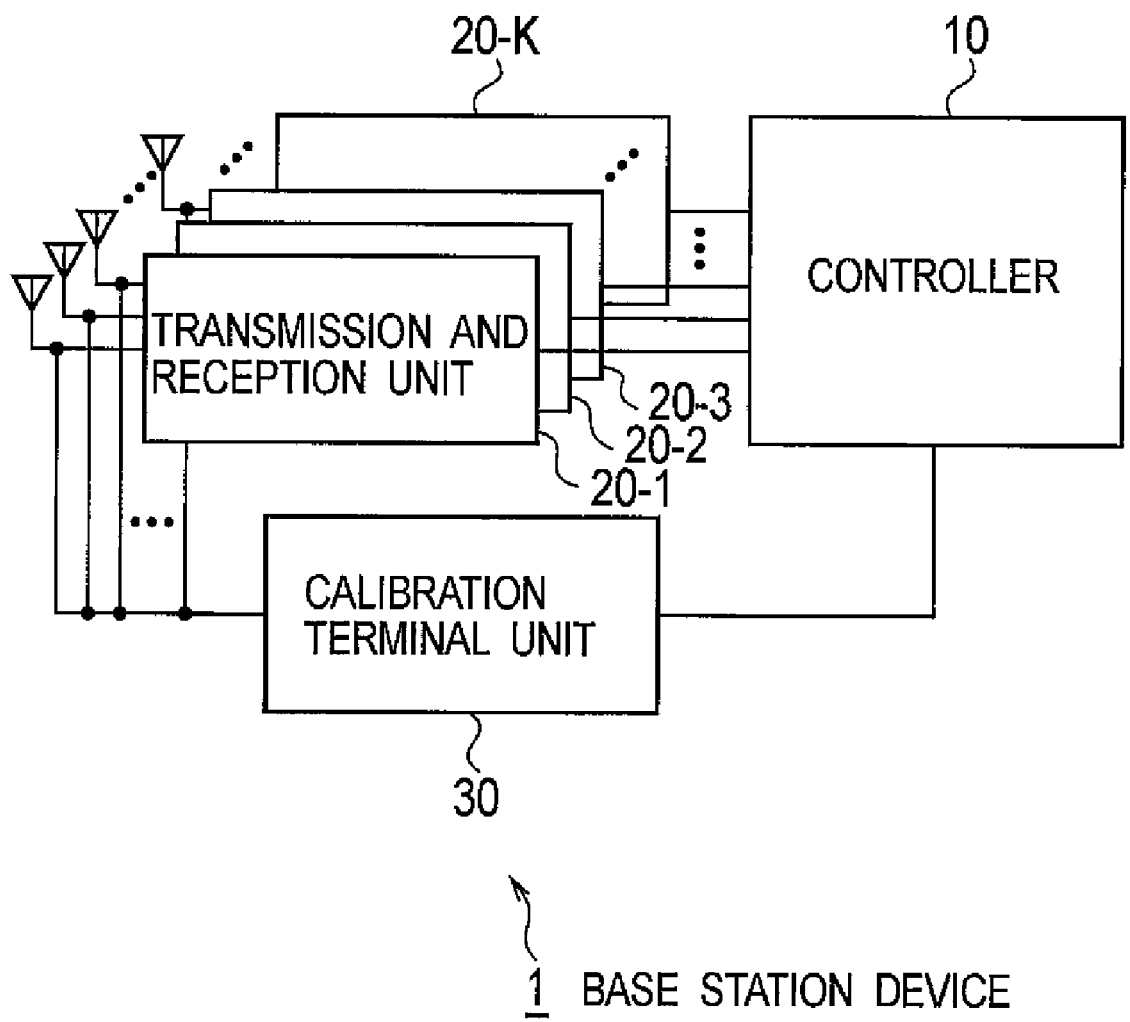
FIG. 1 is a view showing the system configuration of a base station device according to an embodiment of the present invention.

An embodiment of the present invention will be described by referring to the drawings.

FIG. 1 is a view showing the system configuration of a base station device 1 according to the present embodiment. This base station device 1 is a communication device used as a base station device in a mobile communication system. As shown in FIG. 1, the base station device 1 includes a controller 10, a transmission and reception unit 20-$n$ (n=1 to K), and a calibration terminal unit 30.

The controller 10 is a computer equipped with a CPU and a memory. The CPU is a processing unit for executing programs stored in the memory. The CPU performs processing of controlling each of the units in the base station device 1 and achieves the functions to be described later. The memory stores programs and data for carrying out the present embodiment. In addition, the memory also operates as a work memory of CPU.

The transmission and reception unit 20-$n$ includes a transmission system and a reception system. The transmission and reception unit 20-$n$ achieves transmission and reception of radio signals by orthogonal frequency division multiplexing (OFDM). Every transmission and reception unit 20-$n$ has an antenna. Each of the antennas constitutes an adaptive array antenna.

The calibration terminal unit 30 is a communication device configured by adding a calibration related function to the communication device used in the mobile communication system as a mobile station device. The calibration terminal unit 30 is a computer equipped with a CPU and a memory. The CPU is a processing unit for executing programs stored in the memory. The CPU performs processing of controlling each of the units in the calibration terminal unit 30 according to an instruction from the controller 10 and achieves the functions to be described later. The memory stores programs and data for carrying out the present embodiment. In addition, the memory also operates as a work memory of CPU.

In the present embodiment, the calibration terminal unit 30 is connected with each antenna via a coupler (unillustrated). The calibration terminal unit 30 sends calibration signals to the reception system of the transmission and reception unit 20-$n$ via each antenna. The controller 10 acquires the calibration signal which are sent from the calibration terminal unit 30 and outputted from the transmission and reception unit 20-$n$. The controller 10 calculates reception system characteristic data indicating the characteristic of the reception system of the transmission and reception unit 20-$n$ in relation to each of the acquired calibration signals. Then, reception calibration weight is calculated on the basis of the reception system characteristic data.

In addition, the controller 10 sends calibration signals to the transmission system of the transmission and reception unit 20-$n$. The calibration terminal unit 30 acquires the calibration signals which are sent from the controller 10 and which arrive at each of the antennas. The calibration terminal unit 30 calculates transmission system characteristic data indicating the characteristic of the transmission system of the transmission and reception unit 20-$n$ in relation to each of the acquired calibration signals. Then, transmission calibration weight is calculated on the basis of the transmission system characteristic data.

Furthermore, the controller 10 calculates calibration weight on the basis of the reception calibration weight and the transmission calibration weight, which are calculated in the above-described manner. Then, the controller 10 generates a beam forming signal and a null forming signal by using the calibration weight, and sends the generated beam forming signal and null forming signal to the transmission system of the transmission and reception unit 20-$n$.

The calibration terminal unit 30 acquires the beam forming signal and null forming signal which are sent from the controller 10 and which arrive at the antennas, and calculates reception power of the acquired beam forming signal and null forming signal. The controller 10 checks if calibration weight is properly calculated on the basis of the reception power thus calculated. This checking processing is referred to as an FOM (Figure of Merit) processing.

The above-described processings which are, calculation of the reception calibration weight, calculation of the transmission calibration weight, and the FOM processing, are integrally referred to as a calibration processing. In the following description, each of the processings will be described in detail.

Figure 2:
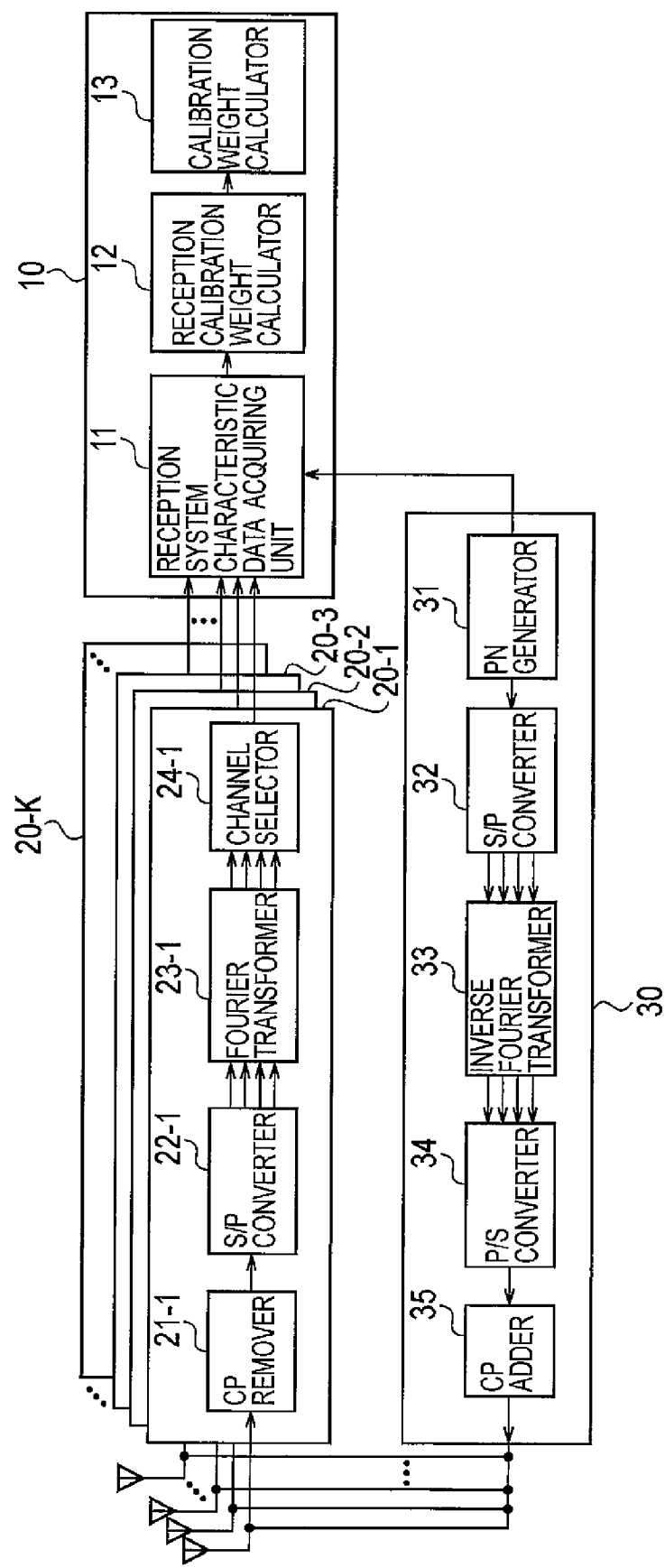
FIG. 2 is a view showing a functional block, among functional blocks of the base station device according to the embodiment of the present invention, relating to calculation of reception calibration weight.

FIG. 2 is a view showing a functional block relating to calculation of the reception calibration weight of the base station device 1. As shown in FIG. 2, the controller 10 includes a reception system characteristic data acquiring unit 11, a reception calibration weight calculator 12, and a calibration weight calculator 13. In addition, the transmission and reception unit 20-$n$ includes a cycle prefix (CP) remover 21-$n$, a serial/parallel (S/P) converter 22-$n$, a Fourier transformer 23-$n$, and a channel selector 24-$n$. Furthermore, the calibration terminal unit 30 includes a pseudo noise (PN) generator 31, an S/P converter 32, an inverse Fourier transformer 33, a parallel/serial (P/S) converter 34, and a CP adder 35.

The PN generator 31 generates a predetermined PN code and outputs the generated PN code to the S/P converter 32. Note that, in the present embodiment, this PN code is used as a calibration signal. The PN code is a diffusion code sequence used for spectrum diffusion, and has the characteristic that different PN codes are orthogonal to each other. In other words, a cross-correlation value between two different PN codes becomes zero when these PN codes are synchronized. In contrast, a cross-correlation value between the two same PN codes (auto-correlation value) becomes the maximum when these two same PN codes are synchronized and becomes smaller as a difference of the synchronization becomes larger.

The S/P converter 32 maps the PN code inputted as serial data on a complex plane. Using 64 QAM as an example, a PN code is divided for every 6 bits and is mapped in 64 constellation points. Then, the S/P converter 32 outputs the data, which are mapped in the respective constellation points, as parallel data to the inverse Fourier transformer 33.

The inverse Fourier transformer 33 performs inverse fast Fourier transformation (IFFT) on the inputted parallel data. As a result, the data mapped in the respective constellation points are allocated to frequencies different to one another. A unit of a frequency allocated at that time is referred to as a subcarrier. The inverse Fourier transformer 33 outputs the data relating to the subcarriers thus acquired to the P/S converter 34.

The P/S converter 34 combines the data relating to the subcarriers inputted from the inverse Fourier transformer 33 and outputs the combined data as one PN signal to the CP adder 35.

The CP adder 35 provides a guard interval between the continuously-transmitting PN signals and repeatedly adds one portion (CP) of the PN signal into the guard interval. This CP is generally used for compensating an error between transmission sections. The CP adder 35 generates a CP added PN signal in this way and sends the generated CP added PN signal to all or some of the transmission and reception units 20-$n$. Here, description will be given on the assumption that the CP adder 35 sends the generated CP added PN signal to all of the transmission and reception units 20-$n$.

The CP remover 21-$n$ removes CP from the CP added PN signal which is sent from the calibration terminal unit 30 to the transmission and reception unit 20-$n$, and outputs the PN signal is to the S/P converter 22-$n$.

The S/P converter 22-n acquires data relating to the subcarriers and outputs the acquired data as parallel data to the Fourier transformer 23-n.

The Fourier transformer 23-n performs fast Fourier transformation (FFT) on the parallel data inputted from the S/P converter 22-n. As a result, data mapped in respective constellation points can be obtained. The Fourier transformer 23-n outputs data in every constellation point thus acquired, to the channel selector 24-n.

The channel selector 24-n acquires an original PN code from the data inputted from the Fourier transformer 23-n and outputs the acquired PN code to the reception system characteristic data acquiring unit 11.

The reception system characteristic data acquiring unit 11 acquires reception system characteristic data (reception system characteristic data relating to the transmission and reception unit 20-n) indicating the characteristic of the PN code inputted from the channel selector 24-n. Specifically, the reception system characteristic data acquiring unit 11 calculates a cross-correlation value $r_n$ between the PN code (reference signal) generated by the PN generator 31 and the PN code (reception signal) inputted from the channel selector 24-n. The calculated cross-correlation value $r_n$ is set to be reception system characteristic data relating to the transmission and reception unit 20-n. This cross-correlation value $r_n$ is expressed by the following formula (1) where $z_n(t)$ is the PN code inputted from the channel selector 24-n, s(t) is the PN code generated by the PN generator 31, E[ ] is an expected value, and * is a complex conjugate.

[Formula 1]

$$r_n = E[z_n(t)s^*(t)] \quad (1)$$

The reception calibration weight calculator 12 calculates reception calibration weight $e_r$ on the basis of the reception system characteristic data relating to each transmission and reception unit 20-n, which is acquired in the reception system characteristic data acquiring unit 11. Specifically, the reception calibration weight calculator 12 calculates reception calibration weight $e_r$ by the following formula (2). Note that, the reception calibration weight $e_r$ is a vector having K elements.

[Formula 2]

$$e_r = [r_1, r_2, r_3 \ldots, r_K] \quad (2)$$

The calibration weight calculator 13 calculates calibration weight CAL on the basis of the reception calibration weight $e_r$ thus calculated and the transmission calibration weight $e_t$ calculated by a transmission calibration weight calculator 44 to be described later.

Figure 3:
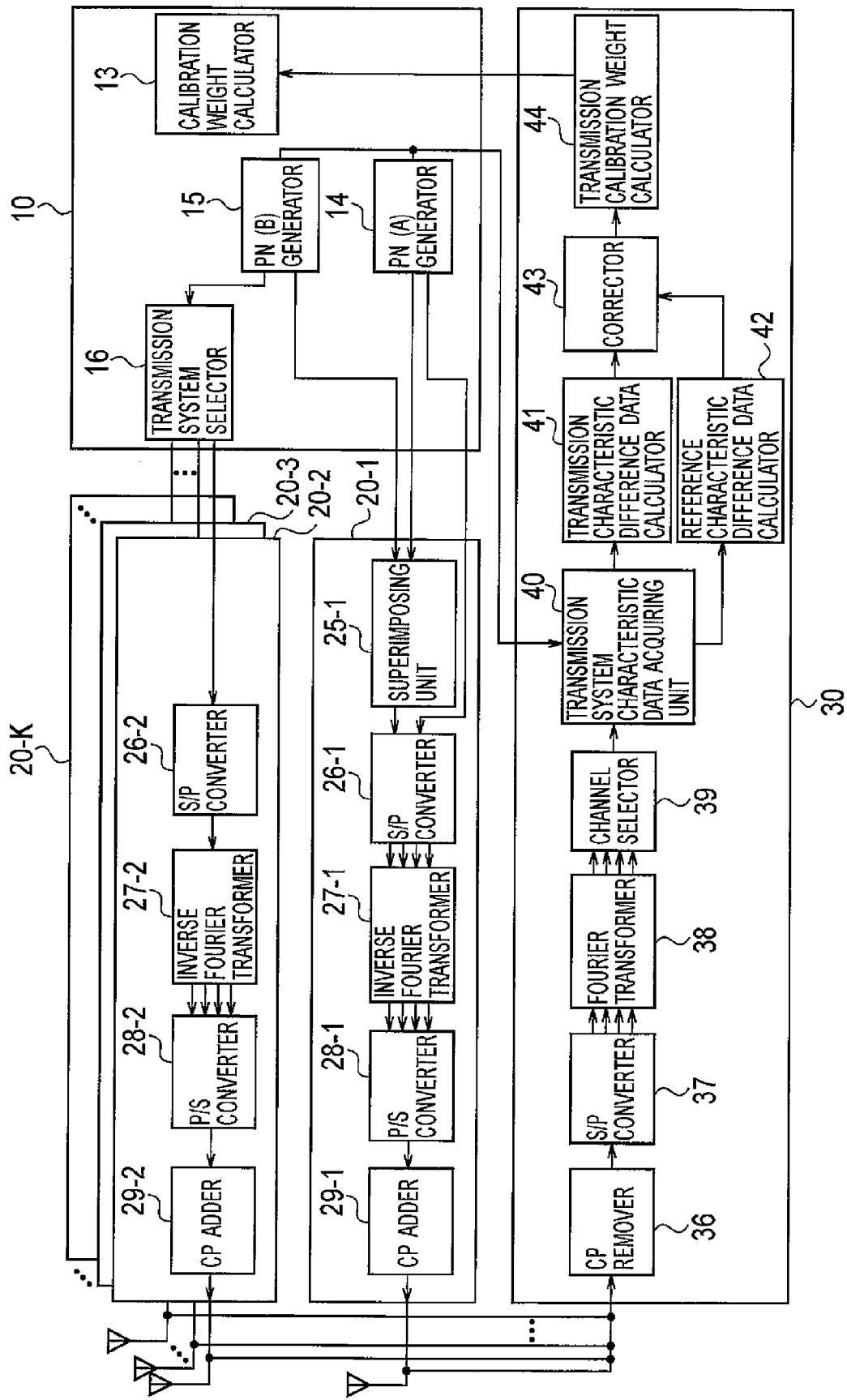
FIG. 3 is a view showing a functional block, among the functional blocks of the base station device according to the embodiment of the present invention, relating to calculation of transmission calibration weight.

FIG. 3 is a view showing a functional block relating to calculation of the transmission calibration weight of the base station device 1. As shown in FIG. 3, the controller 10 includes a calibration weight calculator 13, a PN (A) generator 14, a PN (B) generator 15, and a transmission system selector 16. In addition, the transmission and reception unit 20-n includes an S/P converter 26-n, an inverse Fourier transformer 27-n, a P/S converter 28-n, and a CP adder 29-n. Note that, the transmission and reception unit 20-1 also includes a superimposing unit 25-1. Here, the transmission and reception unit 20-1 is used as a reference transmission system by including this superimposing unit 25-1.

In addition, the calibration terminal unit 30 includes a CP remover 36, an S/P converter 37, a Fourier transformer 38, a channel selector 39, a transmission system characteristic data acquiring unit 40, a transmission characteristic difference data calculator 41, a reference characteristic difference data calculator 42, a corrector 43, and a transmission calibration weight calculator 44.

The PN (A) generator 14 and the PN (B) generator 15 respectively generate a predetermined PN code (A) and a PN code (B). The PN code (A) and the PN code (B) are PN codes whose contents are different from each other.

The PN (A) generator 14 outputs the generated PN code (A) to the superimposing unit 25-1 and the S/P converter 26-1. In contrast, the PN (B) generator 15 outputs the generated PN code (B) to the superimposing unit 25-1 and the transmission system selector 16. The PN (A) generator 14 and the PN (B) generator 15 continuously and repeatedly output the same codes respectively while transmission calibration weight is being calculated.

The superimposing unit 25-1 superimposes by adding the PN code (A) and the PN code (B) and outputs the superimposed PN code (a) and PN code (B) to the S/P converter 26-1 as a superimposed code.

The transmission system selector 16 sequentially selects transmission systems from the transmission and reception unit 20-2 up to the transmission and reception unit 20-K and outputs the PN (B) code to the selected transmission and reception unit 20-n. Note that, in this case, the transmission system selector 16 outputs the PN (B) code to the same transmission and reception unit 20-n over $N_s/2$ ($N_s$ is an even integer) times.

The S/P converter 26-n maps the PN code inputted as serial data on a complex plane. Note that, the S/P converter 26-1 maps each of the PN code (A) and the superimposed code on the complex plane. The S/P converter 26-n outputs the data mapped in the respective constellation points to the inverse Fourier transformer 27-n as parallel data.

The inverse Fourier transformer 27-n performs inverse fast Fourier transformation on the inputted parallel data. As a result, the data mapped in the respective constellation points is allocated to different frequencies (subcarriers).

Figure 4:
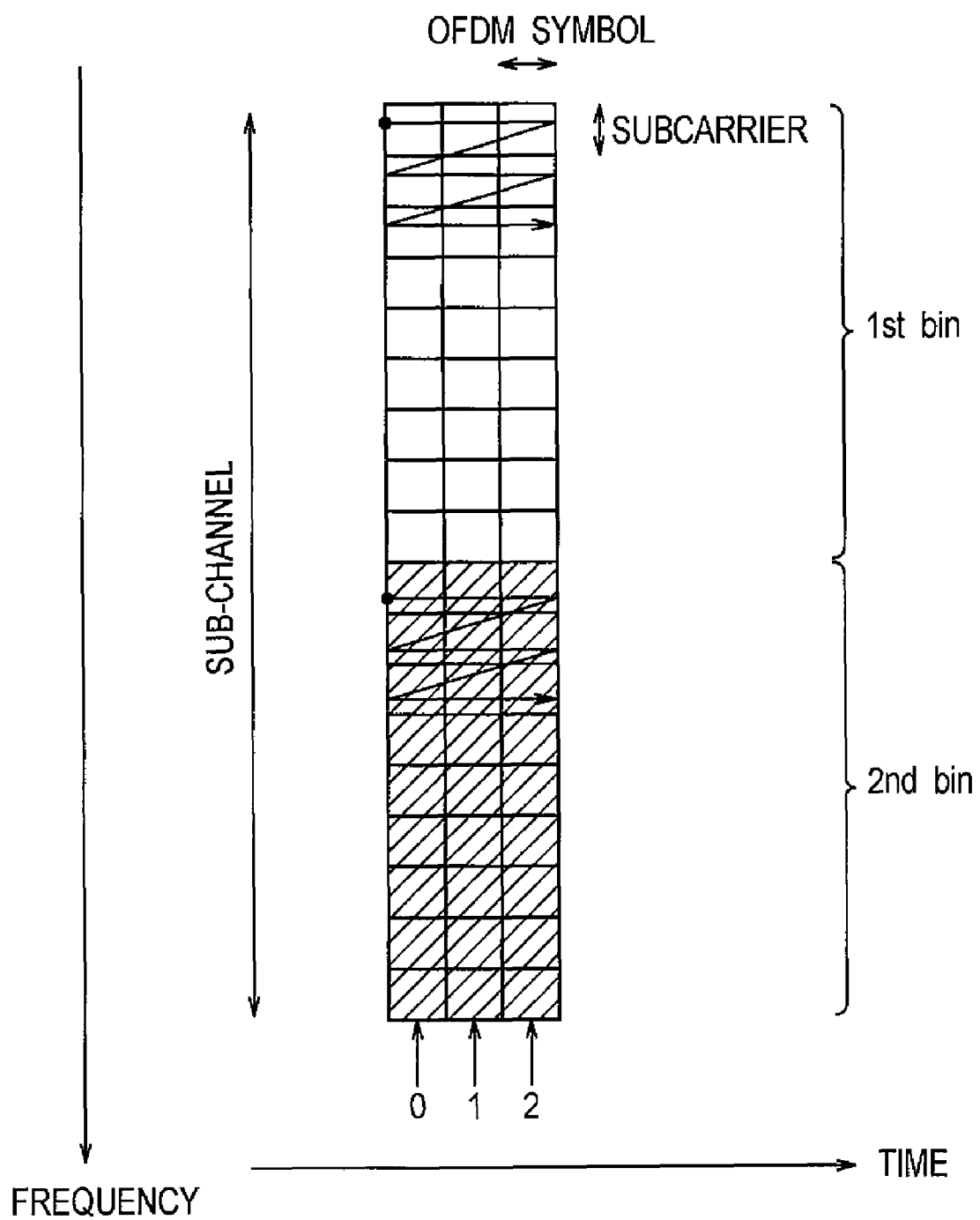
FIG. 4 is a view for illustrating orthogonal frequency division multiplexing.

Here, general orthogonal frequency division multiplexing is described. FIG. 4 is a view for illustrating orthogonal frequency division multiplexing. As shown in FIG. 4, in the orthogonal frequency division multiplexing, data used for one communication is sent by using one sub-channel. This sub-channel is a frequency channel configured of a number of the above-described subcarriers. Some (half) of the subcarriers constituting one sub-channel is referred to as a 1st bin (first box) and the rest portion (remaining half) is referred to as a 2nd bin (second box).

The inverse Fourier transformer 27-1 performs inverse fast Fourier transformation so that the data mapped in the respective constellation points with respect to the superimposed code would be allocated to any one of the sub-carriers being the 1st bin. In contrast, the inverse Fourier transformer 27-1 performs inverse fast Fourier transformation so that the data mapped in the constellation points with respect to the PN code (A) would be allocated to any one of the subcarriers being the 2nd bin. In addition, the inverse Fourier transformer 27-n (n≠1) performs inverse fast Fourier transformation so that the data mapped in the respective constellation points would be allocated to any one of the subcarriers being the 2nd bin.

The inverse Fourier transformer 27-n outputs data relating to each subcarrier thus obtained to the P/S converter 28-n.

The P/S converter 28-n combines the data relating to each subcarrier, which is inputted from the inverse Fourier transformer 27-n, and outputs the combined data to the CP adder 29-n as one PN signal.

The CP adder 29-n generates a CP added PN signal by similar processing to that of the CP adder 35 shown in FIG. 2, and sends the generated CP added PN signal to the calibration terminal unit 30.

Figure 5:
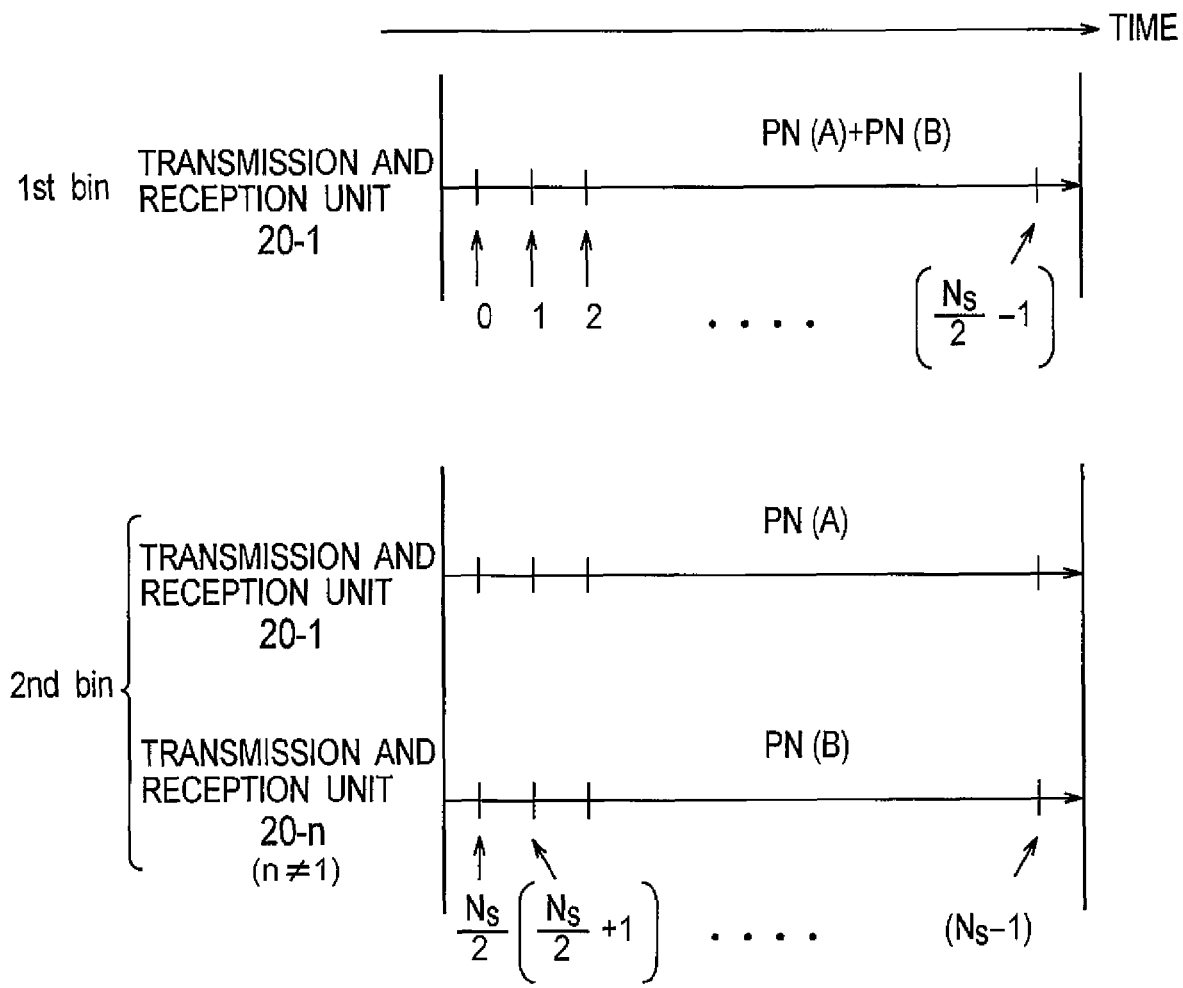
FIG. 5 is a view schematically showing a CP added PN signal which is acquired by a calibration terminal unit in the calculation of the transmission calibration weight according to the embodiment of the present invention.

The CP added PN signal thus sent from the transmission and reception unit 20-$n$ is acquired by the calibration terminal unit 30. FIG. 5 is a view schematically showing the CP added PN signal thus acquired by the calibration terminal unit 30. As shown in FIG. 5, the CP added PN signals which are acquired by the calibration terminal 30 include: a signal according to the superimposed code (signal sent from the transmission and reception unit 20-1) in the 1st bin; and a combined signal of a signal according to the PN code (A) (signal sent from the transmission and reception unit 20-1) and a signal according to the PN code (B) (signal which is sent from the transmission and reception unit 20-$n$ and is selected by the transmission system selector 16) in the 2nd bin.

The CP remover 36 removes CP from the CP added PN signal sent from each transmission and reception unit 20-$n$ and outputs the PN signal to the S/P converter 37.

The S/P converter 37 acquires data relating to each of the subcarriers and outputs the acquired data to the Fourier transformer 38 as parallel data.

The Fourier transformer 38 performs fast Fourier transformation on the parallel data inputted from the S/P converter 37. As a result, data mapped in the respective constellation points is obtained. The Fourier transformer 38 outputs the data in the respective constellation points thus acquired to the channel selector 39.

The channel selector 39 acquires, from the data inputted from the Fourier transformer 38, the superimposed code sent from the transmission and reception unit 20-1, the PN code (A) sent from the transmission and reception unit 20-1, and the PN code (B) sent from the transmission and reception unit 20-$n$ ($n \neq 1$, in the following, a case where n=m (m is a constant) will be described).

The transmission system characteristic data acquiring unit 40 acquires reception system characteristic data indicating characteristics of the superimposed code and the PN codes, which are inputted from the channel selector 39. Specifically, the transmission system characteristic data acquiring unit 40 calculates a cross-correlation value $r_{1AA}$ between the PN code (A) (reference signal) generated by the PN (A) generator 14 and the PN code (A) (reception signal) inputted from the channel selector 39, and uses the calculated cross-correlation value $r_{1AA}$ as reference transmission system characteristic data relating to the transmission and reception unit 20-1. In addition, the transmission system characteristic data acquiring unit 40 calculates a cross-correlation value $r_{mBB}$ between the PN code (B) (reference signal) generated by the PN (B) generator 15 and the PN code (B) (reception signal) inputted from the channel selector 39, and uses the calculated cross-correlation value $r_{mBB}$ as transmission system characteristic data relating to the transmission and reception unit 20-$m$. Furthermore, the transmission system characteristic data acquiring unit 40 calculates a cross-correlation value $r_{1DA}$ between the PN code (A) (reference signal) generated by the PN (A) generator 14 and the superimposed code (reception signal) inputted from the channel selector 39, and uses the calculated cross-correlation value $r_{1DA}$ as a baseline value A of the reference characteristic difference data. In addition, the transmission system characteristic data acquiring unit 40 calculates a cross-correlation value $r_{1DB}$ between the PN code (B) generated by the PN (B) generator 15 (reference signal) and the superimposed code (reception signal) inputted from the channel selector 39, and uses the calculated cross-correlation value $r_{1DB}$ as a baseline value B of the reference characteristic difference data.

Each of the cross-correlation values thus calculated is expressed by the following formulas (3) to (6) where $z_A(t)$, $z_B(t)$, and $z_D(t)$ respectively show the PN code (A), PN code (B), and superimposed code, which are inputted from the channel selector 39, and $s_A(t)$ and $s_B(t)$ respectively show the PN code (A) generated by the PN (A) generator 14 and the PN code (B) generated by the PN (B) generator 15.

[Formula 3]

$$r_{1AA} = E[z_A(t) s_A^*(t)] \qquad (3)$$

[Formula 4]

$$r_{mBB} = E[z_B(t) s_B^*(t)] \qquad (4)$$

[Formula 5]

$$r_{1DA} = E[z_D(t) s_A^*(t)] \qquad (5)$$

[Formula 6]

$$r_{1DB} = E[z_D(t) s_B^*(t)] \qquad (6)$$

The transmission characteristic difference data calculator 41 acquires transmission characteristic difference data SF(m) indicating a difference in transmission characteristic between the transmission and reception unit 20-1 and the transmission and reception unit 20-$m$ on the basis of the reference transmission system characteristic data ($r_{1AA}$) and the transmission system characteristic data ($r_{mBB}$) acquired by the transmission system characteristic data acquiring unit 40. Specifically, the transmission characteristic difference data calculator 41 calculates the transmission characteristic difference data SF(m) by the following formula (7). Note that as described above, the transmission system selector 16 outputs the same signal over $N_s/2$ times to the same transmission and reception unit 20-$n$. In the formula (7), $r_{mBB}(x)$ corresponds to one time thereof, and by calculating the total sum thereof, an average value of the calculated signals of the repeatedly outputted PN codes (B) is reflected on the transmission characteristic difference data SF(m) (See, FIG. 5). In the case of $r_{1AA}(x)$ or in the cases of $r_{1DA}(x)$ and $r_{1DB}(x)$ in the formula (8) to be described later are similar.

[Formula 7]

$$SF(m) = \frac{\sum_{x=N_S/2}^{N_S-1} r_{mBB}(x)}{\sum_{x=N_S/2}^{N_S-1} r_{1AA}(x)} \qquad (7)$$

The reference characteristic difference data calculator 42 acquires reference characteristic difference data indicating the characteristic difference between the PN code (A) and the PN code (A) constituting the superimposed code transmitted from the controller 10 to the transmission and reception unit 20-1. Specifically, the reference characteristic difference data calculator 42 acquires reference characteristic difference data BF on the basis of the baseline value A ($r_{1DA}$) and the baseline value B ($r_{1DB}$) which are acquired by the transmission system characteristic data acquiring unit 40. More specifically, the reference characteristic difference data calculator 42 calculates the reference characteristic difference data BF by the following formula (8).

[Formula 8]

$$BF = \frac{\sum_{x=0}^{N_S/2-1} r_{1DB}(x)}{\sum_{x=0}^{N_S/2-1} r_{1DA}(x)} \quad (8)$$

The corrector 43 corrects the transmission characteristic difference data SF(m) acquired by the transmission characteristic difference data calculator 41 on the basis of the reference characteristic difference data BF acquired by the reference characteristic difference data calculator 42, and acquires a channel difference data coef(m). Specifically, as shown in the formula (9), the corrector 43 divides BF into SF(m) to make coef(m) Then, the corrector 43 outputs the calculated coef(m) to the transmission calibration weight calculator 44.

[Formula 9]

$$\text{coef}(m) = \frac{SF(m)}{BF} \quad (9)$$

The transmission calibration weight calculator 44 calculates transmission calibration weight $e_t$ of coef(n) outputted from the corrector 43 on the basis of the transmission characteristic difference data SF(n) acquired by the transmission characteristic difference data calculator 41 and the reference characteristic difference data BF acquired by the reference characteristic difference data calculator 42 in relation to each of the transmission and reception units 20-$n$ (n≠1). Specifically, the transmission calibration weight calculator 44 calculates transmission calibration weight $e_t$ as shown in the figure (10). Note that, reception calibration weight $e_t$ is a vector having K elements.

[Formula 10]

$$e_1 = [1, \text{coef}(2), \text{coef}(3), \ldots, \text{coef}(k)] \quad (10)$$

The calibration weight calculator 13 calculates calibration weight CAL on the basis of the reception calibration weight $e_r$ and the transmission calibration weight $e_t$. Specifically, the calibration weight calculator 13 calculates calibration weight CAL by performing the calculation of the formula (11). Note that, the calibration weight CAL is also a vector having K elements. In addition, CAL(n), $e_{rn}$, and $e_{tn}$ respectively show elements of the transmission and reception unit 20-$n$, among the elements of CAL, $e_r$, and $e_t$.

[Formula 11]

$$CAL(n) = \frac{e_{rn}}{e_{tn}} \quad (11)$$

The processing relating to the above-described transmission calibration weight calculation will be described again in more detail by referring to the processing flowchart.

Figure 6:
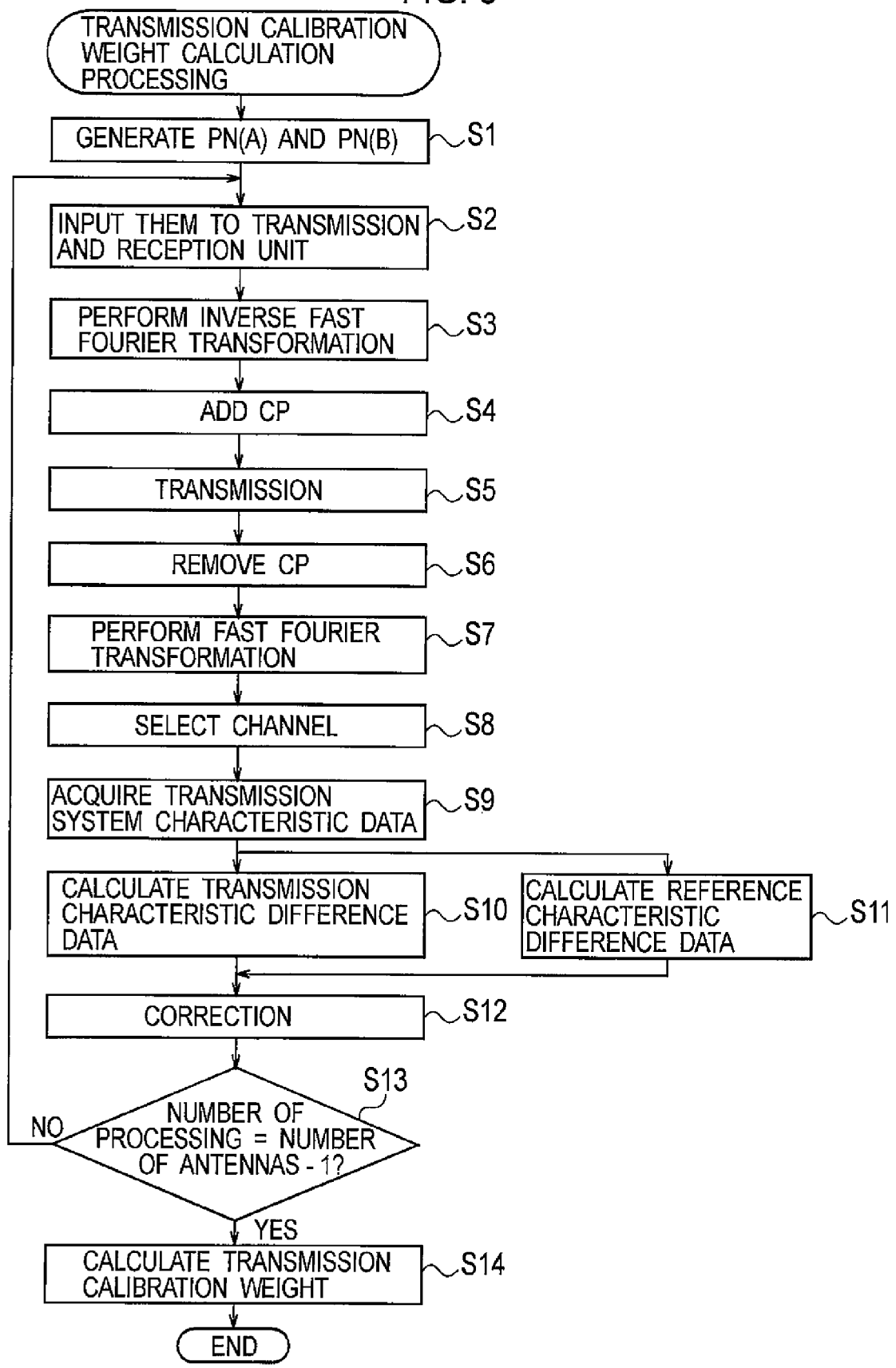
FIG. 6 is a view showing a processing flow of the base station device relating to transmission calibration weight calculation according to the embodiment of the present invention.

FIG. 6 is a view showing a processing flow of the base station device 1 relating to transmission calibration weight calculation. As shown in FIG. 6, the base station device 1 firstly generates a PN code (A) and a PN code (B) (S1). Thereafter, the base station device 1 inputs the PN code (A), and a superimposed code formed by superimposing the PN code (A) and the PN code (B) to the transmission and reception unit 20-1 and the PN code (B) to the transmission and reception unit 20-$n$ (n≠1) (S2).

The transmission and reception unit 20-$n$ performs, on each code inputted at S2, inverse fast Fourier transformation (S3) and CP addition (S4) and transmits the resultant code to the calibration terminal unit 30 (S5). The calibration terminal unit 30 receiving the code performs CP removal (S6), fast Fourier transformation (S7), and channel selection (S8) and acquires transmission system characteristic data (S9). Then, the base station device 1 calculates, based on the transmission system characteristic data thus acquired, transmission characteristic difference data (S10) and reference transmission characteristic difference data (S11). Furthermore, the base station device 1 corrects the transmission characteristic difference data using the reference characteristic difference data (S12).

When the above-described processing is finished for all the transmitters-receivers 20-$n$ (n≠1) (S13), the calibration terminal unit 30 calculates transmission calibration weight (S14).

Figure 7:
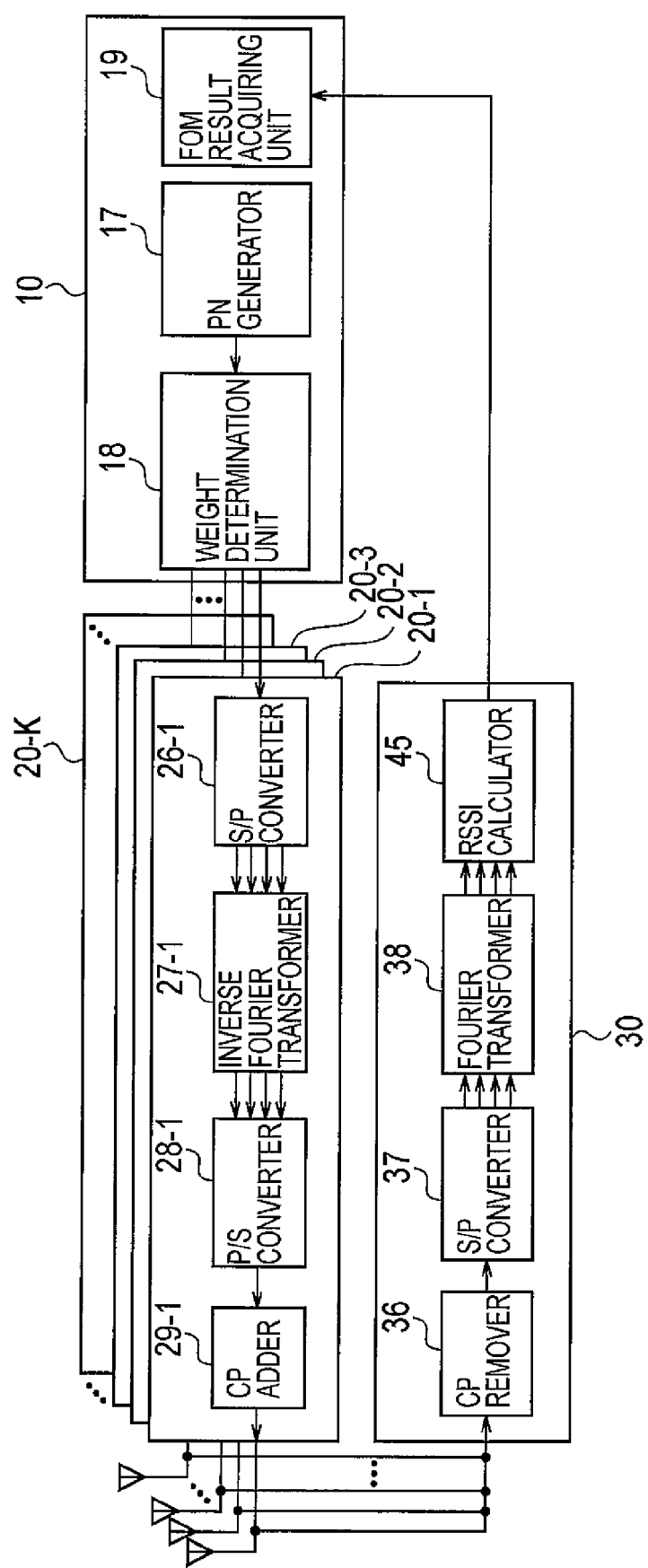
FIG. 7 is a view showing a functional block, among functional blocks of the base station device according to the embodiment of the present invention, relating to FOM processing.

FIG. 7 is a view showing a functional block relating to FOM processing of the base station device 1. As shown in FIG. 7, the controller 10 includes a PN generator 17, a weight determination unit 18, and an FOM result acquiring unit 19. In addition, the transmission and reception unit 20-$n$ includes an S/P converter 26-$n$, an inverse Fourier transformer 27-$n$, a P/S converter 28-$n$, and a CP adder 29-$n$. The calibration terminal unit 30 includes a CP remover 36, an S/P converter 37, a Fourier transformer 38, and an RSSI calculator 45.

The PN generator 17 generates a predetermined PN code for FOM processing. Any code may be used for this PN code.

The weight determination unit 18 generates a beam forming signal and a null forming signal on the basis of calibration weight CAL calculated by the calibration weight calculator 13 and sends the generated beam forming signal and null forming signal to a transmission system of each transmission and reception unit 20-$n$. Specifically, the weight determination unit 18 generates transmission weight $W_{beam}$ by the following formula (12) and multiplies this weight to the transmission signal generated on the basis of the above-described PN code so as to generate a beam forming signal. In addition, the weight determination unit 18 generates transmission weight $W_{nUll}$ by the following formula (13) and multiplies this weight to the transmission signal generated on the basis of the above-described PN code so as to generate a null forming signal. Note that, each weight is a vector having K elements. In addition, $W_{beam}(n)$ and $W_{null}(n)$ show elements of the transmission and reception unit 20-$n$ among the elements of $W_{beam}$ and $W_{null}$, respectively. In addition, $r_n$ is calculated by the formula (1).

[Formula 12]

$$W_{beam}(n) = CAL \cdot r_n \quad (12)$$

[Formula 13]

$$W_{null}(n) = CAL \frac{1}{r_n} e^{j\frac{2\pi n}{K}} \quad (13)$$

The S/P converter 26-$n$, the inverse Fourier transformer 27-$n$, the P/S converter 28-$n$, the CP adder 29-$n$, the CP remover 36, the S/P converter 37, and the Fourier transformer 38 perform signal processing as described above.

The RSSI calculator 45 calculates a received signal strength indicator (RSSI) of each of the beam forming signal and the null forming signal.

Furthermore, the RSSI calculator 45 calculates a RSSI difference FOM on the basis of the RSSI thus calculated. Specifically, the RSSI calculator 45 performs calculation of the following formula (14) and calculates the RSSI difference FOM in a unit of dB. Note that, $RSSI_{beam}$ and $RSSI_{null}$ are RSSI relating to the beam forming signal and the null forming signal, respectively.

[Formula 14]

$$FOM = RSSI_{beam} - RSSI_{null} \quad (14)$$

The RSSI calculator 45 outputs the RSSI difference FOM thus calculated to the FOM result acquiring unit 19.

The FOM result acquiring unit 19 checks if the calibration weight is properly calculated on the basis of the inputted FOM. Specifically, the FOM result acquiring unit 19 determines that calibration weight is properly calculated if this FOM is larger than a predetermined threshold, and that calibration weight is not properly calculated if FOM is equal to or lower than the predetermined threshold. As a result, if it is determined that calibration weight is not properly calculated, it is desirable that the controller 10 restarts the calibration processing.

The above-described processing will be described together by referring to the processing sequence between the controller 10 and the calibration terminal unit 30.

Figure 8:
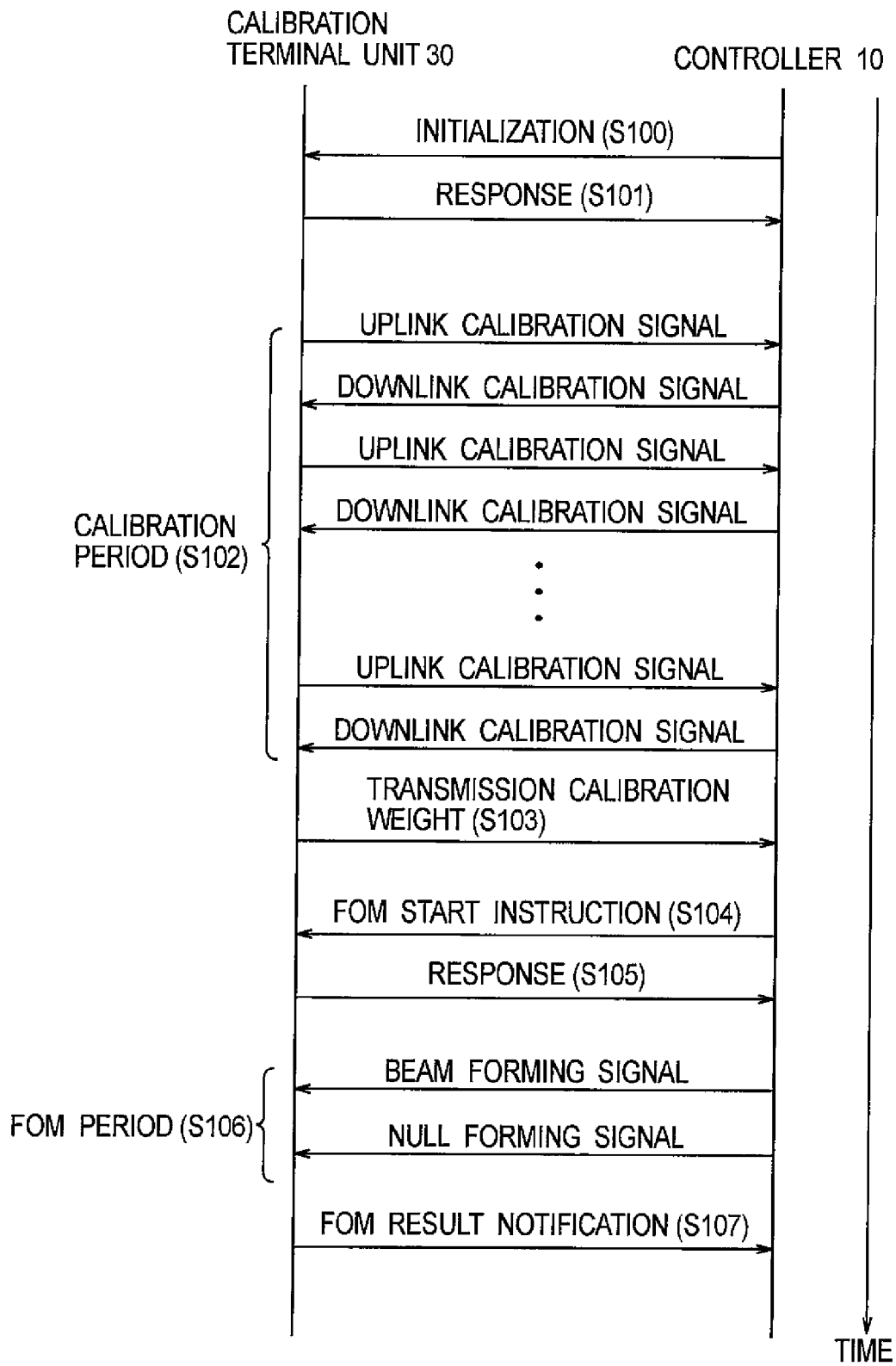
FIG. 8 is a view showing a processing sequence between a controller and a calibration terminal unit according to the embodiment of the present invention.

FIG. 8 is a view showing a processing sequence between the controller 10 and the calibration terminal unit 30. If the controller 10 starts calibration processing, the controller 10 firstly transmits an initialization signal to the calibration terminal unit 30 (S100). When the calibration terminal unit 30 responds to this signal (S101), the controller 10 starts the calibration processing.

Here, the base station device 1 is performing time division duplex communications. In other words, an uplink signal (signal received by the transmission and reception unit 20-*n*) and a downlink signal (signal transmitted by the transmission and reception unit 20-*n*) are alternately transmitted and received at the same frequency. The controller 10 also causes the calibration terminal unit 30 to transmit a calibration signal to the transmission and reception unit 20-*n* (downlink calibration signal) in synchronization with the transmission of a calibration signal from the transmission and reception unit 20-*n* to the calibration terminal unit 30 (uplink calibration signal) in the above-described time division duplex communications. In short, the uplink calibration signal and the downlink calibration signal are alternately sent (S102).

When the processing of S102 is completed for all the transmitters-receivers 20-*n* (n≠1), the controller 10 acquires reception calibration weight. In addition, the calibration terminal unit 30 acquires transmission calibration weight and transmits the acquired transmission calibration weight to the controller 10 (S103). The controller 10 calculates calibration weight on the basis of the acquired reception calibration weight and the received transmission calibration weight.

When the calibration weight is calculated, the controller 10 transmits an FOM start instruction signal to the calibration terminal unit 30 (S104). When the calibration terminal unit 30 responds to this signal (S105), the controller 10 starts the FOM processing.

In the FOM processing, the controller 10 sequentially transmits a beam forming signal and a null forming signal (S106). The calibration terminal unit 30 receives these signals to calculate FOM and notifies the controller 10 of a result thereof (S107).

As Described Above, According to the Base Station Device 1, calibration signals can be simultaneously sent to a reference transmission system (the transmission and reception unit 20-1 in the above-described embodiment) and other transmission systems (the transmitters-receivers 20-*n* other than the transmission and reception unit 20-1 in the above-described embodiment). Accordingly, a possibility that transmission system characteristic data are successfully calculated under the same condition between these transmission systems is increased. Thus, a possibility that transmission characteristic difference data calculated by the transmission characteristic difference data calculator 41 properly indicates a difference in transmission characteristic between these transmission systems is also increased. Consequently, it is achieved to decrease a risk that a relative difference in transmission characteristic between the transmission systems is not properly reflected on transmission weight.

In addition, the different calibration signals are simultaneously sent to the reference transmission system and other transmission systems. Accordingly, even when the calibration signals are received by one calibration terminal unit 30, these calibration signals can be separately received.

Furthermore, even when there is the characteristic difference because signal contents of the calibration signals are different, correction can be made on the basis of the reference characteristic difference data based on the characteristic difference.

In addition, different subcarriers (1st bin and 2nd bin) in a predetermined sub-channel are utilized to simultaneously send respective calibration signals. Accordingly, the possibility that the transmission characteristic difference data and the reference characteristic difference data are successfully calculated under the same condition is increased. Consequently, it is achieved to further decrease the risk that a relative difference in transmission characteristic between the transmission systems is not properly reflected on calibration weight.

Furthermore, reception system characteristic data can be acquired while downlink calibration signals are sequentially being sent. In other words, reception system characteristic data can be acquired by subtracting one time from the number of the transmission systems. Accordingly, accuracy of reception calibration weight can be increased by, for example, using an average value thereof. Note that, the contents of Japanese Patent Application No. 2006-121347 (filed on Apr. 25, 2006) are entirely incorporated herein by reference.

Industrial Applicability

As described above, a communication device and transmission calibration weight calculation method according to the present invention can achieve a decrease of a risk that a relative difference in transmission characteristic between transmission systems is not properly reflected on transmission calibration weight, and thus is useful in a radio communication such as a mobile communication.

The invention claimed is:

1. A communication device having an adaptive array antenna, comprising:

a transmission system sender configured to send a first calibration signal to a reference transmission system which is one of transmission systems respectively corresponding to a plurality of antennas constituting the adaptive array antenna, while sending a second calibration signal having a signal content different from a signal content of the first calibration signal to other transmission systems;

a reference transmission system characteristic data acquiring unit configured to acquire reference transmission system characteristic data indicating a characteristic of the reference transmission system, in relation to the first calibration signal sent by the transmission system sender to the reference transmission system;

a transmission system characteristic data acquiring unit configured to acquire transmission system characteristic data indicating characteristics of the other transmission systems, in relation to the second calibration signal sent by the transmission system sender to the other transmission systems;

a transmission characteristic difference data acquiring unit configured to acquire transmission characteristic difference data indicating a difference in transmission characteristic between the reference transmission system and the other transmission systems, on the basis of the reference transmission system characteristic data acquired by the reference transmission system characteristic data acquiring unit and the transmission system characteristic data acquired by the transmission system characteristic data acquiring unit;

a transmission calibration weight calculator configured to calculate transmission calibration weight on the basis of the transmission characteristic difference data acquired by the transmission characteristic difference data acquiring unit in relation to each of the transmission systems other than the reference transmission system among the transmission systems;

a superimposing transmission system sender configured to superimpose the first calibration signal and the second calibration signal, and to send a signal resulting from the superimposition to the reference transmission system;

a reference characteristic difference data acquiring unit configured to acquire reference characteristic difference data indicating the characteristic difference between the first calibration signal and the second calibration signal, which are sent by the superimposing transmission system sender to the reference transmission system; and a corrector configured to correct the transmission characteristic difference data acquired by the transmission characteristic difference data acquiring unit, on the basis of the reference characteristic difference data acquired by the reference characteristic difference data acquiring unit, wherein the transmission calibration weight calculator calculates transmission calibration weight, on the basis of the transmission characteristic difference data after correction by the corrector.

2. The communication device according to claim 1, wherein the communication device performs orthogonal frequency division multiplexing communication;

the superimposing transmission system sender performs the sending by one or a plurality of predetermined subcarriers in a predetermined sub-channel; and the transmission system sender performs the sending by a subcarrier other than the one or a plurality of predetermined subcarriers in the predetermined sub-channel in synchronization with the sending by the superimposing transmission system sender.

3. The communication device according to claims 1 or 2, wherein the transmission system sender sequentially sends the second calibration signal, together with the first calibration signal sent to the reference transmission system, to the respective transmission systems other than the reference transmission system among the transmission systems respectively corresponding to the plurality of antennas constituting the adaptive array antenna, the communication device further comprising:

a reception system sender configured to send a third calibration signal to all or some of reception systems respectively corresponding to the plurality of antennas constituting the adaptive array antenna in synchronization with the transmission by the transmission system sender;

a reception system characteristic data acquiring unit configured to acquire reception system characteristic data indicating the characteristic of the reception system in relation to the third calibration signal send by the reception system sender to the reception system; and a reception calibration weight calculator configured to calculate reception calibration weight on the basis of the reception system characteristic data acquired by the reception system characteristic data acquiring unit.

4. A transmission calibration weight calculation method for calculating transmission calibration weight in a communication device having an adaptive array antenna, the method comprising:

a transmission system sending step of sending a first calibration signal to a reference transmission system which is one of transmission systems respectively corresponding to a plurality of antennas constituting the adaptive array antenna, while sending a second calibration signal having a signal content different from a signal content of the first calibration signal to other transmission systems;

a reference transmission system characteristic data acquiring step of acquiring reference transmission system characteristic data indicating the characteristic of the reference transmission system, in relation to the first calibration signal sent to the reference transmission system at the transmission system sending step;

a transmission system characteristic data acquiring step of acquiring transmission system characteristic data indicating characteristics of the other transmission systems, in relation to the second calibration signal sent to the other transmission systems at the transmission system sending step;

a transmission characteristic difference data acquiring step of acquiring transmission characteristic difference data indicating a difference in transmission characteristic between the reference transmission system and the other transmission systems, on the basis of the reference transmission system characteristic data acquired at the reference transmission system characteristic data acquiring step and the transmission system characteristic data acquired at the transmission system characteristic data acquiring step;

a transmission calibration weight calculation step of calculating transmission calibration weight on the basis of the transmission characteristic difference data acquired at the transmission characteristic difference data acquiring step in relation to the transmission systems other than the reference transmission system, among the plurality of transmission systems;

a superimposing transmission system sending step of superimposing the first calibration signal and the second calibration signal, and sending a signal resulting from the superimposition to the reference transmission system;

a reference characteristic difference data acquiring step of acquiring reference characteristic difference data indicating the characteristic difference between the first calibration signal and the second calibration signal, which are sent by the superimposing transmission system sending step to the reference transmission system; and a correcting step of correcting the transmission characteristic difference data acquired by the transmission characteristic difference data acquiring step, on the basis of the reference characteristic difference data acquired by the reference characteristic difference data acquiring step, wherein the transmission calibration weight calculation step calculates transmission calibration weight, on the basis of the transmission characteristic difference data after correction by the correcting step.

* * * * *